(12) United States Patent
Fuchs et al.

(10) Patent No.: US 11,780,189 B2
(45) Date of Patent: Oct. 10, 2023

(54) APPARATUS AND METHOD FOR SEPARATING MATERIALS WITH DIFFERENT DEGREES OF FLOWABILITY

(71) Applicant: Nordischer Maschinenbau Rud. Baader GmbH + Co. KG, Lübeck (DE)

(72) Inventors: Michael Fuchs, Lübeck (DE); Joachim Härtlein, Lübeck (DE); Uwe Karsten, Lübeck (DE); Friedemann Hanf, Lübeck (DE); Olaf Schwarz, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 131 days.

(21) Appl. No.: 17/486,009

(22) Filed: Sep. 27, 2021

(65) Prior Publication Data
US 2022/0097331 A1    Mar. 31, 2022

(30) Foreign Application Priority Data
Sep. 28, 2020    (DE) .......................... 102020125225.0

(51) Int. Cl.
*B30B 9/24*    (2006.01)
*A22C 17/04*    (2006.01)

(52) U.S. Cl.
CPC .............. *B30B 9/241* (2013.01); *B30B 9/246* (2013.01); *A22C 17/04* (2013.01)

(58) Field of Classification Search
CPC .......... B30B 9/241; B30B 9/246; B30B 9/247
See application file for complete search history.

(56) References Cited

U.S. PATENT DOCUMENTS 3,734,000 A     5/1973   Ziener
5,894,791 A  *  4/1999   Rose ...................... B30B 9/241
                                                   100/153

FOREIGN PATENT DOCUMENTS

| CN | 102986820 A     | 3/2013  |
|----|-----------------|---------|
| DE | 202004014365 U1 | 11/2004 |
| DE | 202007004473 U1 | 7/2007  |
| DE | 102013014418 A1 | 3/2015  |
| WO | 2008/116650 A1  | 10/2008 |

\* cited by examiner

*Primary Examiner* — Jacob S. Scott
*Assistant Examiner* — Miraj T. Patel
(74) *Attorney, Agent, or Firm* — DINSMORE & SHOHL LLP (57) ABSTRACT

An apparatus for separating materials with different degrees of flowability has a rotationally driven hollow drum with a perforated peripheral surface, which is releasably arranged on a drive element. A continuous press belt can be pressed against the hollow drum from the outside while wrapping around a portion of the circumference of the hollow drum. The press belt and the hollow drum cooperate to form an intake wedge for the pressed material. The drive element has at least one controllably movable holding means which is configured and adapted to controllably lock the hollow drum on the drive element as well as to controllably release the hollow drum from the drive element. A corresponding method is also provided.

21 Claims, 6 Drawing Sheets

APPARATUS AND METHOD FOR SEPARATING MATERIALS WITH DIFFERENT DEGREES OF FLOWABILITY

CROSS-REFERENCE TO RELATED APPLICATIONS

This application claims priority to German application number 10 2020 125 225.0 filed Sep. 28, 2020, the disclosure of which is hereby incorporated by reference in its entirety.

FIELD OF THE INVENTION

The present invention relates to an apparatus for separating materials with different degrees of flowability, comprising a rotationally driven hollow drum with a perforated peripheral surface, which hollow drum is releasably arranged on a drive element, a continuous press belt which can be pressed against the hollow drum from the outside while wrapping around a portion of the circumference of the hollow drum and which, together with the hollow drum, forms an intake wedge for the pressed material. In addition, the invention relates to a method for operating an apparatus for separating materials with different degrees of flowability.

BACKGROUND OF THE INVENTION

Such apparatuses and methods are used in various industrial sectors. Basically, it is possible to separate materials with a flow behaviour that differs from each other. Such apparatuses and methods are used, for example, in the processing of animal/fish bodies for separating skin, meat and/or sinew parts from animal bones or fish bones. They are also used for separating the pulp from the peel, stems, pips or stones of vegetables or fruit. Another area of use is the separation of composite packaging, for example beverage packaging cartons which consist of cardboard boxes coated with plastic film and/or aluminium foil.

The apparatuses for separating materials with different degrees of flowability, also known as press separation machines, generally comprise a hollow drum provided with a perforated peripheral surface and a press belt operatively connected to the hollow drum in a partial circumferential region. In particular, the hollow drum is driven via a drive element. In addition, the press belt is frequently rotationally driven. The material to be pressed and separated enters an intake region between the resilient press belt and the perforated hollow drum. Such perforated hollow drums are also referred to as perforated drums. In this intake region, the press belt together with the hollow drum forms an intake wedge for the material to be pressed. Due to different degrees of flowability of the partial components of the material to be pressed, the more flowable components are pushed through the perforated peripheral surface of the hollow drum from the outside to the inside. Such apparatuses and methods are already well enough known, for example from documents DE 20 2004 014365 U1 and DE 20 2007 004473 U1.

It is often necessary to detach the hollow drum from the drive element for the purposes of cleaning, maintenance and/or replacement. One disadvantage of the known apparatuses and methods is that the hollow drum is releasably connected to the drive element by means of a screw connection. Such a connection is implemented either via a central nut or a plurality of bolts or nuts distributed on the base of the hollow drum. On the one hand, it is always necessary to use tools to loosen this connection. On the other hand, the bolt heads, nuts or threads arranged in the interior of the hollow drum become contaminated such that it is not always possible to guarantee that they will work perfectly.

In addition, it is often necessary to first clean adhesive components of the material to be pressed from the respective parts of the bolted connection before it is even possible to apply the tools for loosening the bolted connection. Such contamination and any residues remaining even after preliminary cleaning frequently result in the tools slipping.

A further disadvantage is that the relevant tightening torques vary greatly when tightening such bolted connections. If the required holding torques are not achieved during tightening, there is a risk that the hollow drum may unintentionally detach from the drive element and cause damage to the machine and/or injury to the machine operator.

SUMMARY OF THE INVENTION

It is therefore the object of the present invention to propose an apparatus of the type referred to hereinbefore which allows the hollow drum to be installed on and removed from the drive element as conveniently and easily as possible, while at the same time ensuring that, in the installed state, the hollow drum is reliably secured on the drive element against unintentional detachment from said drive element. It is also the object of the present invention to provide an apparatus which enables tool-free installation and removal of the hollow drum. The object is further to propose a corresponding method.

The object is achieved by an apparatus having the features referred to hereinbefore in that the drive element comprises at least one controllably movable holding means which is configured and adapted to controllably lock the hollow drum on the drive element as well as to controllably release the hollow drum from the drive element. Advantageously, it is thus possible for the first time to release or restore the connection between the drive element and the hollow drum in a particularly convenient manner, in particular without tools, if required.

In addition, this always ensures that, after being locked using the controllably movable holding means, the hollow drum is secured against unintentional loosening of the connection between the hollow drum and the drive element. Using the apparatus according to the invention, it is always ensured that the hollow drum is pressed against the drive element with the required pretension via the controllably movable holding means and is thus securely locked therewith.

An expedient embodiment of the invention is characterised in that the drive element comprises a hollow drum holder, and a rear wall element of the hollow drum has a recess adapted to receive the hollow drum holder in a positive-locking and/or non-positive-locking manner. In other words, the hollow drum holder is configured as a holding shaft which the hollow drum is adapted to be placed onto by means of the recess in the rear wall element. Advantageously, the hollow drum can thus be arranged on the drive element in a simple and convenient manner and can be detached therefrom again if necessary. The clear width of the recess in the rear wall element is preferably correspondingly matched to the outer diameter of the hollow drum holder.

A preferred development of the invention is characterised in that the hollow drum holder is adapted in the manner of a hollow shaft, forming an internal space, and the holding means comprises a pin element which is arranged in the internal space of the hollow drum holder so as to be controllably movable about the longitudinal axis. The hollow drum holder therefore fulfils a dual function: On the one hand, the peripheral surface of the hollow drum holder serves as the holding shaft for the hollow drum and, on the other hand, the holding means configured as a pin element is located in the internal space of the hollow drum holder. In this way, the pin element is arranged so as to be protected against mechanical damage from outside.

At the same time, the hollow drum holder configured in the manner of a hollow shaft is adapted to be as compact as possible. In addition, the components required to enable the pin element to be controllably moved about the longitudinal axis are reliably protected against contamination by the arrangement in the internal space of the hollow drum holder, in particular against such contamination as is caused by material to be pressed present in the hollow drum. This constantly ensures a particularly high level of reliability when locking the hollow drum holder with the drive element by means of the holding means or the pin element. At the same time, the spatial separation satisfies the high hygiene requirements in the food processing sector.

A further expedient embodiment of the invention is characterised in that the pin element is adapted at its free end to receive a releasable closing element. Using the said closing element, it is possible to secure the hollow drum temporarily against unintentional detachment from the drive element after it has been placed on the hollow drum holder. For this purpose, the closing element is arranged on the free end of the pin element. This is preferably done manually such that there is no need to use tools for this. The actual locking of the hollow drum holder on the drive element, with which the two are non-rotatably connected to each other, only takes place when the pin element is moved into a locking position by means of the controllably movable holding means. This pre-stresses the closing element arranged on the free end of the pin element in the direction of the drive element by means of the controllably movable holding means for locking thereof.

According to a further preferred embodiment of the invention, the closing element has a bayonet mount adapted to releasably connect to the free end of the pin element. Such a bayonet mount has the advantage that the closing element can be attached to the free end of the pin element or detached again therefrom by means of a simple movement of the hand. In this way, the hollow drum can be conveniently pre-secured during installation before the hollow drum is finally locked on the drive element by means of the controllably movable holding means.

According to a further preferred embodiment, the closing element and the free end of the pin element each have threads such that the closing element is adapted to be screwable to the free end of the pin element. Advantageously, the closing element can thus be arranged manually without tools by simply screwing onto the pin element. In an equally simple manner, the closing element can be unscrewed from the pin element in order to finally release the closing element from the pin element. In particular, the closing element is configured as a lock nut and the free end has an external thread adapted to receive the lock nut.

A preferred development of the invention is characterised in that the pin element is mechanically connected by means of an adjusting unit in such a manner that the position of the pin element is adapted to be positionally adjustable in a controllably variable manner. The position of the pin element can be controlled via the adjusting unit, namely into a closing position and a release position. In the closing position, the pin element is moved by means of the adjusting unit such that the hollow drum is pretensioned against the drive element via the closing element. If the connection between the hollow drum and the drive element is to be loosened, the adjusting unit is used to move the pin element into the release position in which the closing element in any case rests on the rear wall element of the hollow drum force-free, or is already at a distance therefrom. In this state, the closing element can be loosened manually from the hollow drum holder such that the hollow drum can be released completely from the hollow drum holder.

A further expedient embodiment of the invention is characterised in that the adjusting unit is a hydraulic unit, a pneumatic unit or a linear electric motor unit. Execution as a hydraulic adjusting unit has the advantage that the required pretension for locking the hollow drum holder on the drive element is predefinable via the relevant hydraulic pressure. In addition, with a comparatively compact design, such a hydraulic unit is able to provide the necessary forces for providing an adequate level of pretension.

Another advantage is the robust design of such hydraulic units which is less susceptible to faults. Alternatively, the adjusting unit is executed as a pneumatic unit but may also be configured as a linear motor unit. The adjusting unit is preferably arranged in the internal space and in this manner is encapsulated.

A further expedient embodiment of the invention is characterised in that the hydraulic unit comprises a two-chamber hydraulic cylinder. This has the advantage of enabling active adjustment of the pin element in two directions, namely, on the one hand, towards the drive element for locking the hollow drum on the drive element and, on the other hand, away from the drive element for loosening the connection between the hollow drum holder and the drive element. In particular when loosening the connection between the hollow drum holder and the drive element, this ensures that the closing element comes free from the rear wall element of the hollow drum such that the closing element can be released from the pin element without tools.

According to a further preferred embodiment of the invention, the closing element is configured to be conical on the hollow drum side, in particular the recess in the rear wall element of the hollow drum comprises at least one through-recess portion and a conical centring recess. Advantageously, the conically configured closing element together with the at least one through-recess portion brings about centring of the hollow drum holder during the locking process. This has the advantage of automatically self-centring the hollow drum.

In addition, the object is achieved by a corresponding method having the features referred to hereinbefore in that locking of the hollow drum on the drive element as well as releasing it from the drive element is controlled by means of a controllably movable holding means. The advantages associated with the method according to the invention have already been described in detail above based on the apparatus according to the invention. To avoid repetition, reference is made at this point in connection with the method according to the invention to the merits of the apparatus according to the invention mentioned above. They also apply by analogy to the method according to the invention.

A further expedient configuration of the invention is characterised by controlled moving of a pin element of the holding means about the longitudinal axis in an internal space of the hollow drum holder which is configured in the manner of a hollow shaft.

A preferred development of the invention is characterised by arranging the closing element on the free end of the pin element.

According to a further preferred configuration of the invention, the closing element is arranged on the free end of the pin element by means of a bayonet mount.

According to a further preferred embodiment, the closing element is screwed to the free end of the pin element, preferably only hand-tight.

A further expedient configuration of the invention is characterised by controlled adjustment of the position of the pin element by means of an adjusting unit to which the pin element is mechanically connected.

According to a further preferred configuration of the invention, the position is adjusted hydraulically, pneumatically and/or linearly by electric motor by means of the adjusting unit.

According to a further preferred configuration of the invention, the adjusting unit is moved in the internal space in a controlled manner.

For the advantageous configurations of the method according to the invention referred to above, with regard to their advantages, reference is also made to the remarks above concerning the merits of the apparatus according to the invention.

These apply to the said advantageous configurations of the method according to the invention in the same way as to the merits of the advantageous embodiments of the apparatus according to the invention already described above.

Further preferred and/or expedient features and configurations of the invention emerge from the description. Especially preferred embodiments are explained in greater detail with reference to the attached drawing. The drawing shows.

DETAILED DESCRIPTION OF THE INVENTION

Figure 1:
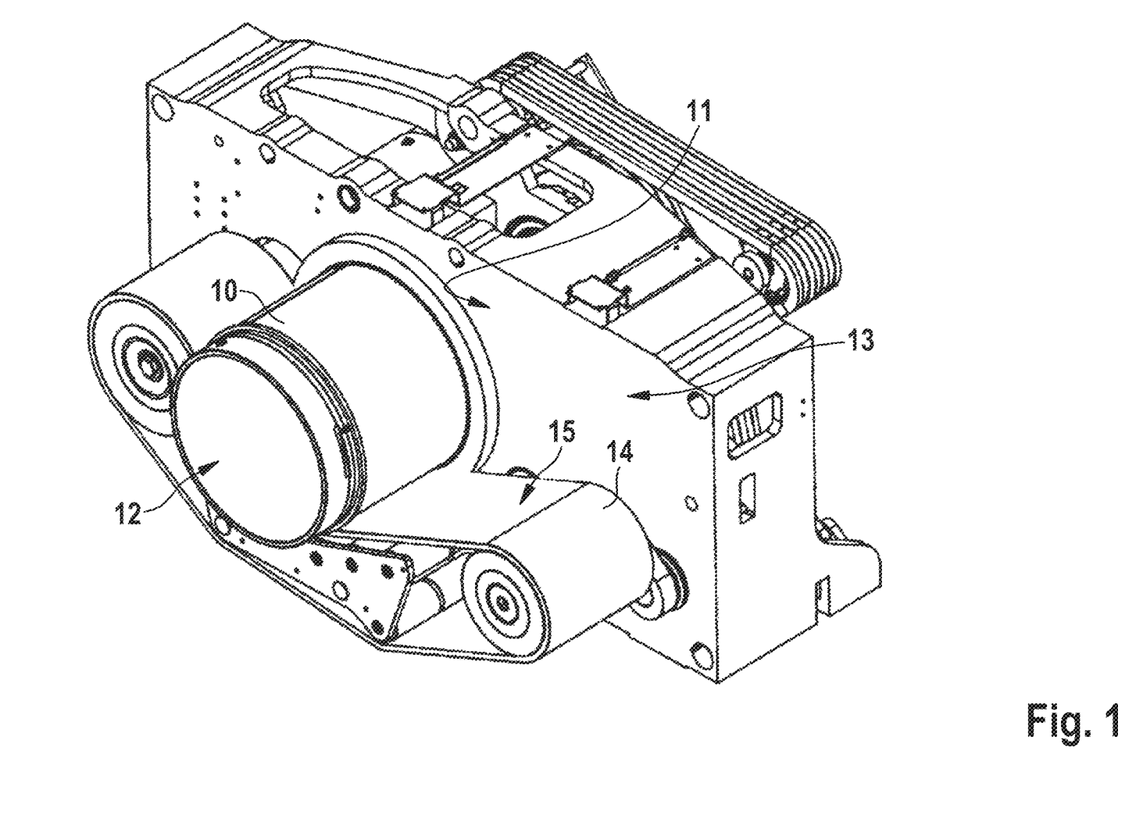
FIG. 1 is a perspective view of the apparatus according to the invention.

FIG. 1 shows a perspective view of the apparatus according to the invention. The apparatus comprises a hollow drum 10 which is rotationally driven by means of a drive element 11, shown only partially in FIG. 1. The hollow drum 10 comprises a perforated peripheral surface, not shown in the drawing, through which fractions of the material to be pressed with a higher degree of flowability pass into an internal space 12, while those fractions of the pressed material with a lower degree of flowability remain in the external space 13 of the hollow drum 10.

The apparatus further comprises a continuous press belt 14. The press belt 14 is adapted to be pressed against the hollow drum 10 from the outside while wrapping around a portion of the hollow drum 10. The press belt 14 together with the hollow drum 10 thus form an intake wedge 15 for the pressed material.

Figure 2:
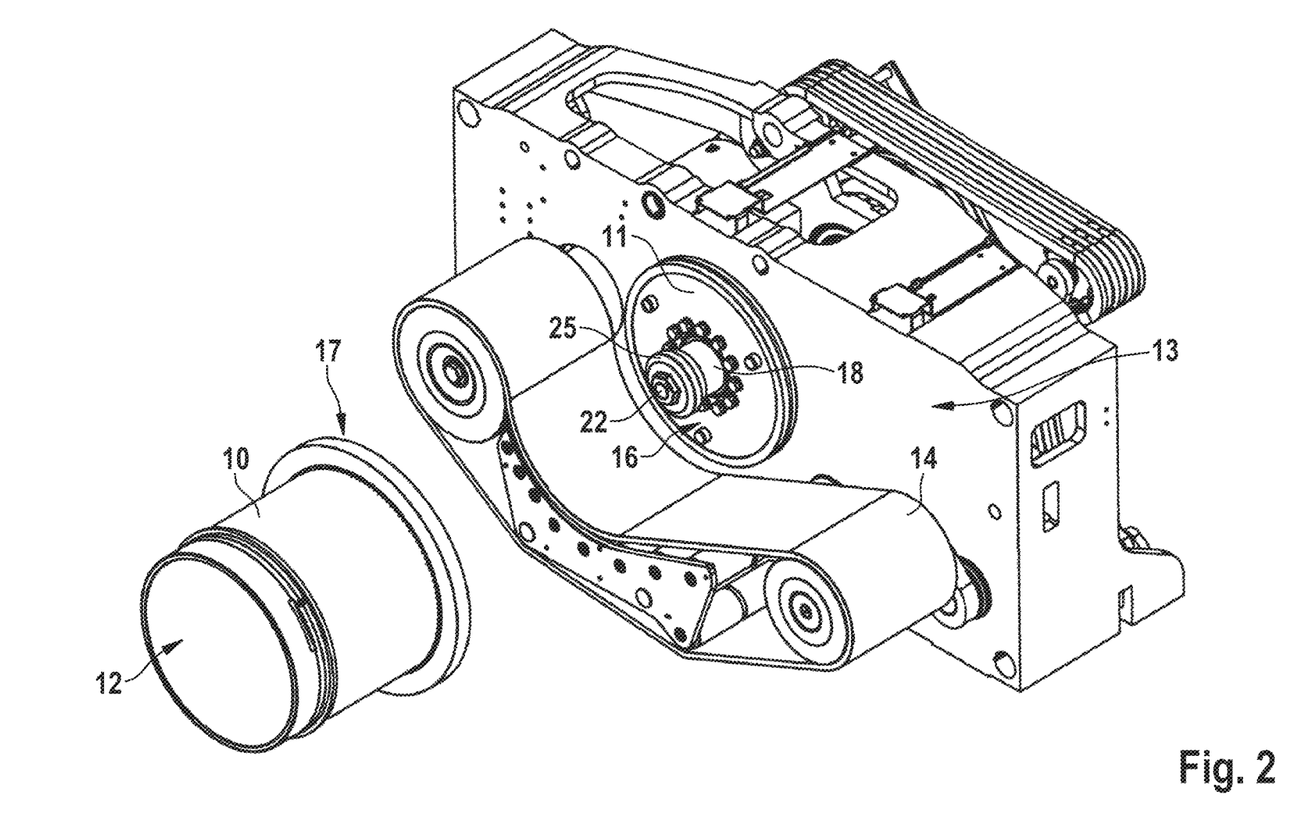
FIG. 2 is a perspective view of the apparatus shown in FIG. 1 with the hollow drum removed.

As shown in FIG. 2, the hollow drum 10 is releasably arranged on the drive element 11. In this way, the hollow drum 10 can be installed and removed for maintenance and replacement purposes. The drive element 11 comprises at least one controllably movable holding means 16. The holding means 16 is configured to controllably lock the hollow drum 10 on the drive element 11 or to controllably release it from the drive element 11. This makes it possible to remove or install the hollow drum 10, during which locking or releasing of the hollow drum 10 is brought about by the controllably movable holding means 16. When the hollow drum 10 is locked on the drive element 11, they form a non-rotatable unit.

Figure 3:
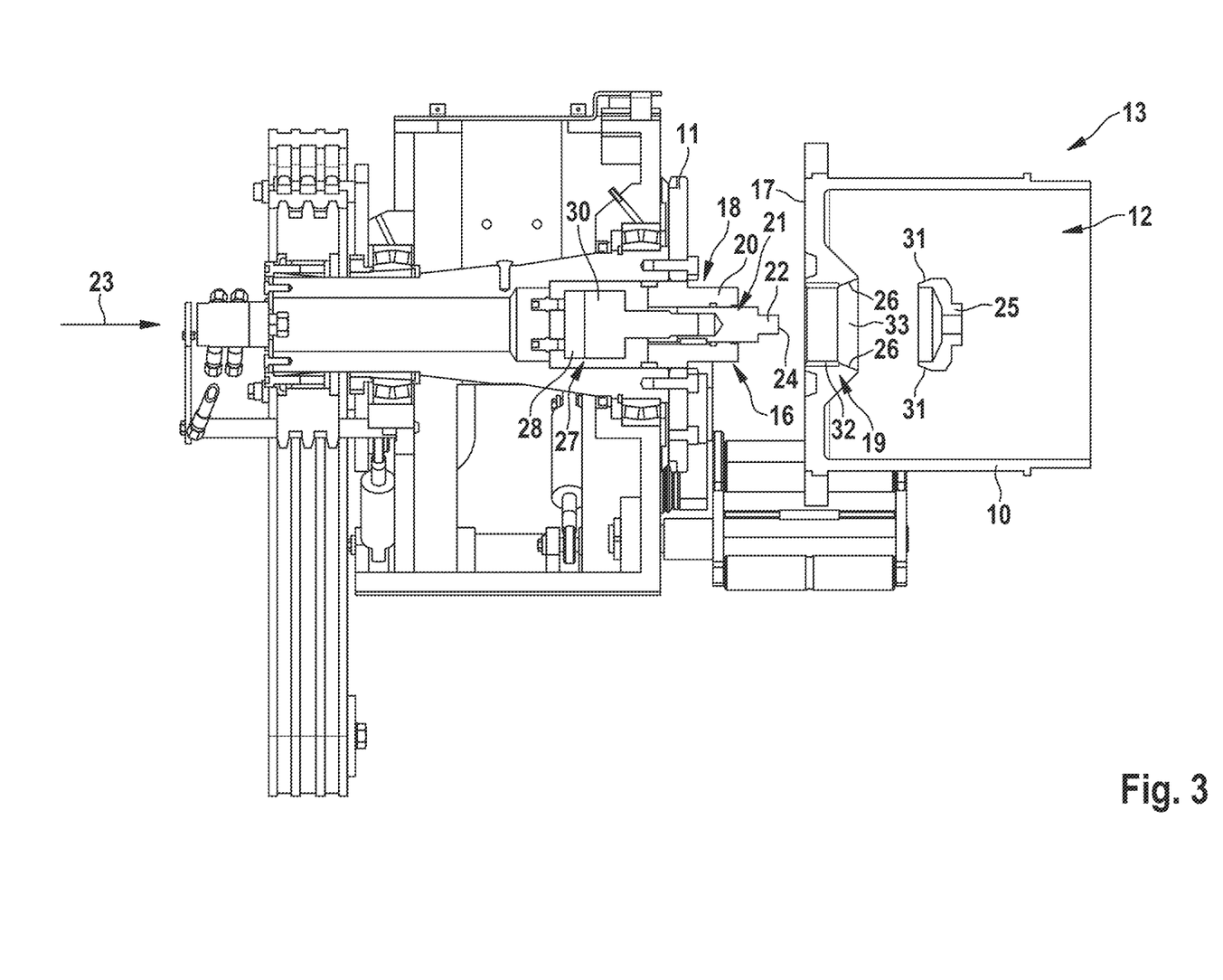
FIG. 3 is a lateral view in section of the apparatus with the hollow drum removed and the locking element released.

The sectional view shown in FIG. 3 shows the apparatus according to the invention with the hollow drum 10 removed. The hollow drum 10 comprises a rear wall element 17. The rear wall element 17 delimits the internal space 12 in the hollow drum 10 towards the side of the drive element 11. The drive element 11 further comprises a hollow drum holder 18. The hollow drum holder 18 forms a centring and fastening element in order to releasably connect the hollow drum 10 to the drive element 11. For this purpose, the rear wall element 17 of the hollow drum 10 comprises a recess 19 which is adapted to receive the hollow drum holder 18 in a positive-locking and/or non-positive-locking manner.

The hollow drum holder 18 is preferably configured in the manner of a hollow shaft, i.e. it comprises a hollow shaft 20 which forms an internal chamber 21. The holding means 16 comprises a pin element 22 which is arranged in the internal space 21 of the hollow drum holder 18 or its hollow shaft 20 in the longitudinal axial direction 23 in a controllably variable manner. In other words, the pivot element 22 is adapted in such a manner that it is adapted to be controllably movable in the longitudinal axial direction 23 in a positionally variable manner.

Figure 4:
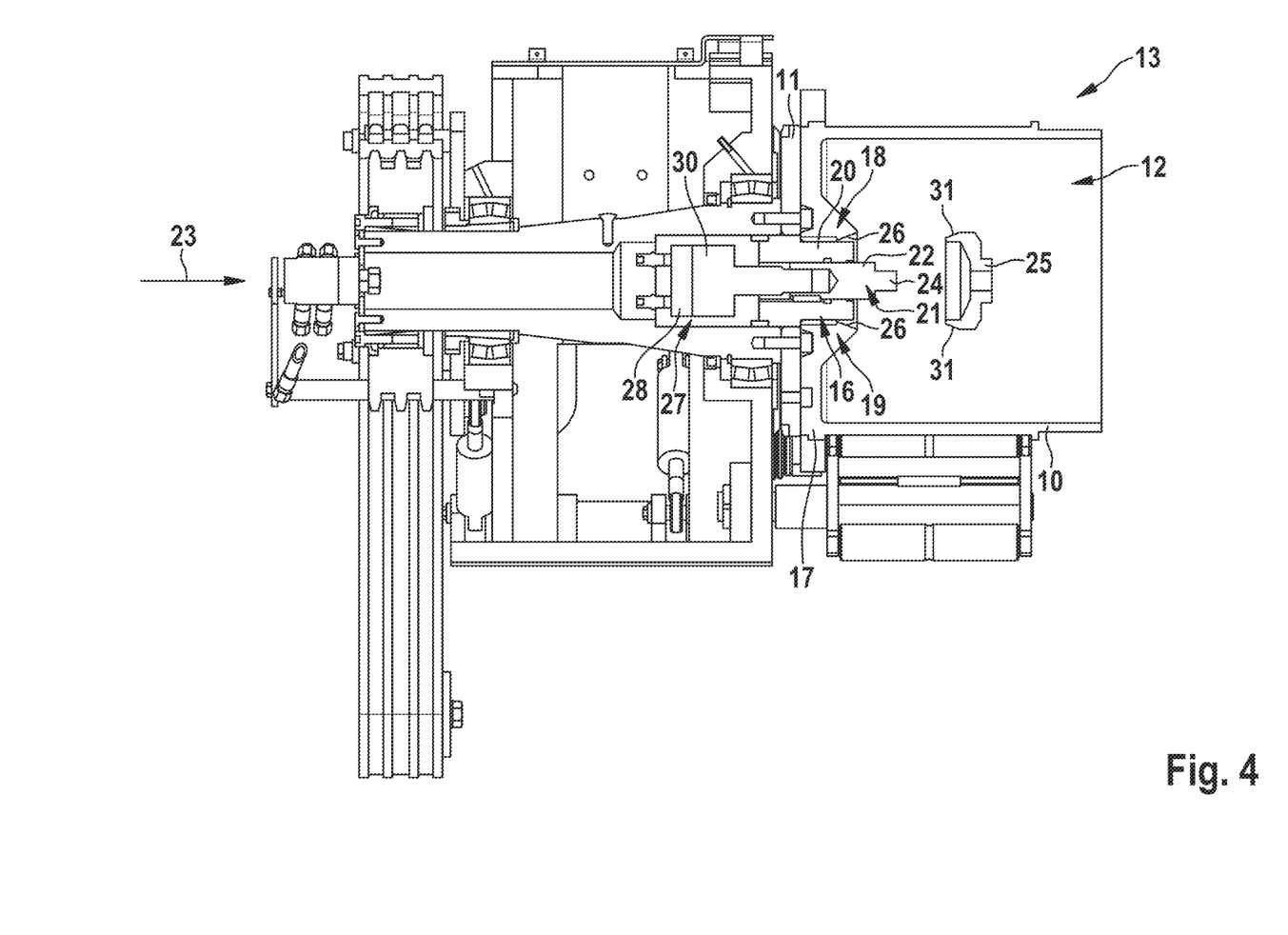
FIG. 4 is a lateral view in section of the apparatus with the hollow drum installed and with the holding element not locked.

As shown in FIG. 4, the hollow drum 10 with its recess 19 can be placed onto the hollow drum holder 18 during installation. In this case, the hollow drum holder 18 passes through the recess 19. The pin element 22 is preferably adapted at its free end 24 to receive a releasable closing element 25. The closing element 25 is adapted in such a manner that in any case it at least partially covers the recess 19 in the radial direction. In this way, the closing element 25 forms a type of clamping element, by means of which the hollow drum 10 is adapted to be lockable with the drive element 11 by positioning the pin element 22 in the direction of the drive element 11. By moving the pin element 22 in the opposite direction, the clamping bond is released and locking of the hollow drum 10 on the drive element 11 is reversed.

Figure 5:
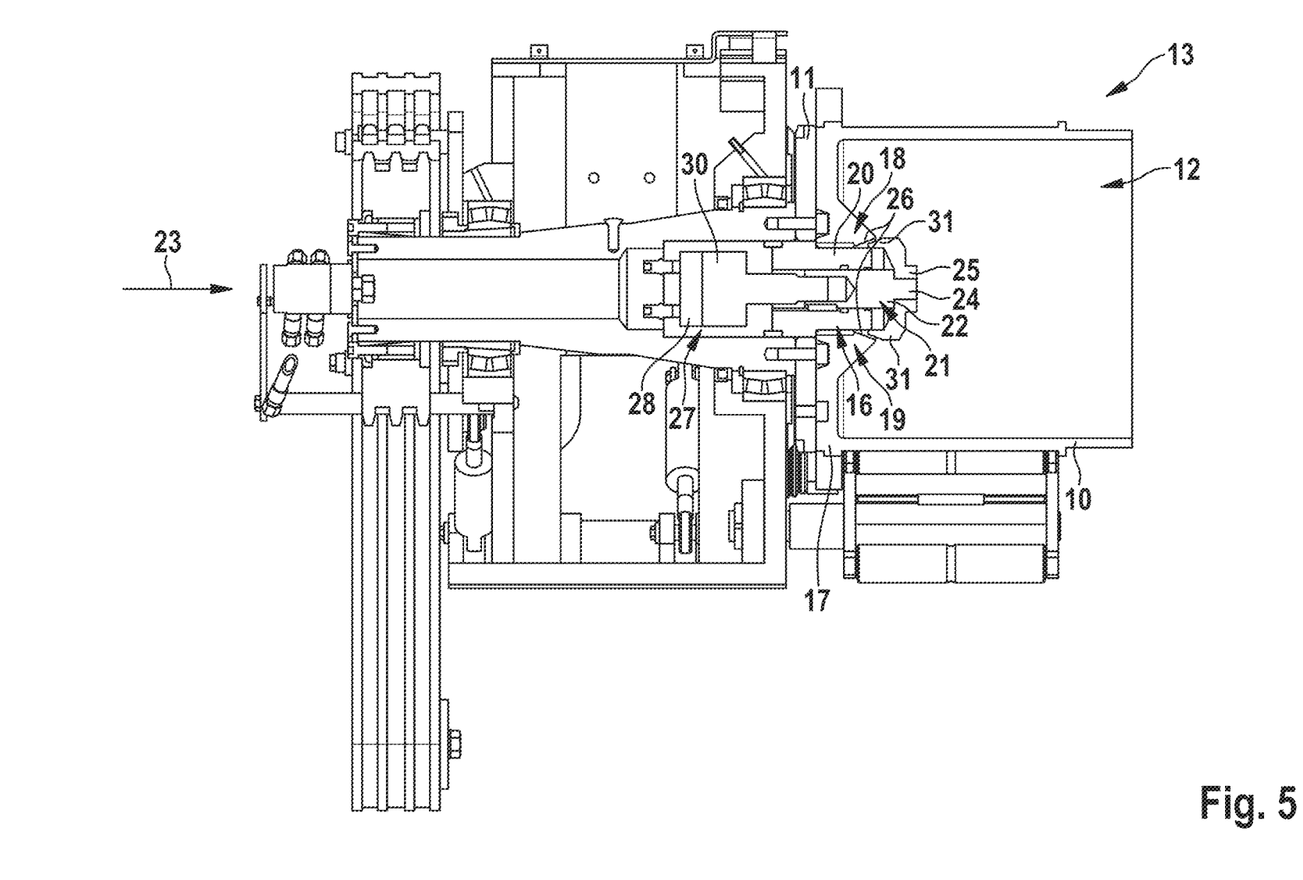
FIG. 5 is a lateral view in section of the apparatus with the hollow drum installed during locking of the holding element.
Figure 6:
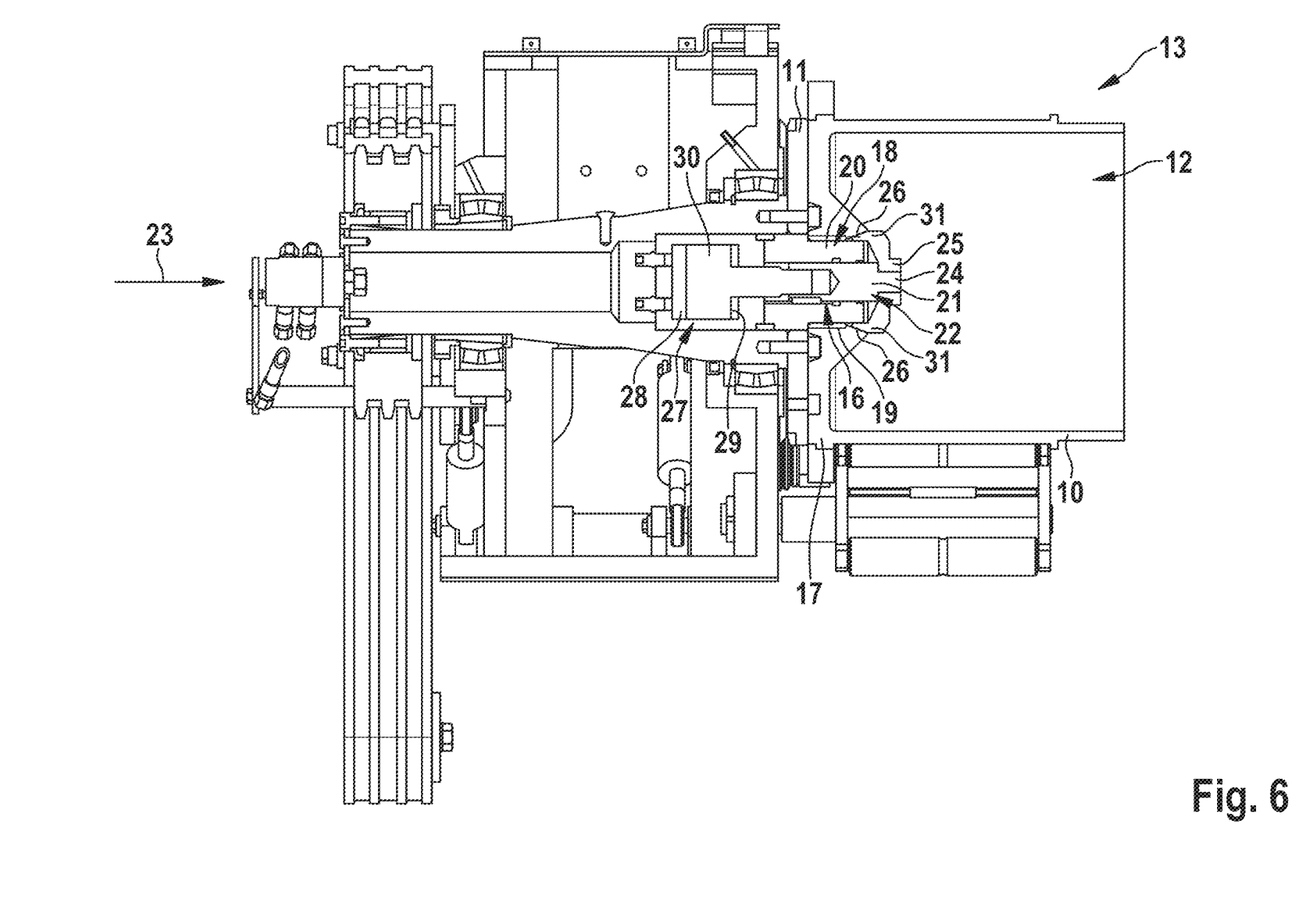
FIG. 6 is a lateral view in section of the apparatus with the hollow drum installed and with the holding element locked.

The process of locking the hollow drum 10 on the drive element 11 is illustrated step-by-step with reference to FIGS. 5 and 6. As shown in the drawing, the recess 19 in the rear wall element 17 of the hollow drum 10 is preferably configured as a through recess with conical clamping surfaces 26. The through recess, as shown in the drawing, is configured to taper in the direction of the drive element 11. This has the advantage that when the pin element 22 moves in the direction of the drive element 11, the closing element 25 finally enters the clamping seat arrangement, shown in FIG. 6, in which the hollow drum 10 is non-rotatably connected to the drive element 11 via the clamping bond formed from the pin element 22, the closing element 25 and the recess 19.

The closing element 25 is releasably arranged on the pin element 22. For example, the closing element 25 and the free end 24 of the pin element 22 each have threads such that the closing element 25 is adapted to be screwable to the free end 24 of the pin element 22, as shown in the drawing. Especially preferably, the closing element 25 is configured as a lock nut and the free end 24 has an external thread adapted to receive the lock nut.

According to an alternative embodiment of the invention, not shown in the drawing, the closing element 25 has a bayonet mount by means of which the closing element 25 is adapted to be releasably connectable to the free end 24 of the pin element 22.

The pin element 22 is mechanically connected or coupled to an adjusting unit 27 in such a manner that the position of the pin element 22 is adapted to be positionally adjustable in a controllably variable manner. In other words, the adjusting unit 27 is adapted to change the position of the pin element 22 in the longitudinal axial direction 23 in a controllably variable manner. The adjusting unit 27 is preferably configured as a hydraulic unit or a pneumatic unit.

Alternatively, the adjusting unit 27 is configured as a linear electric motor, not shown in the drawing, which comprises, for example, a servomotor by means of which the desired positions of the pin element 22 in the longitudinal axial direction 23 can be approached in a controllably variable manner. The adjusting unit 27 is preferably arranged in the internal space 21 of the hollow shaft 20.

For example, such a hydraulic or pneumatic unit comprises a two-chamber system with a first chamber 28 and a second chamber 29, which are separated from each other by a piston 30 arranged so as to be slidably movable in the longitudinal axial direction 23. By controlled pressure application of the respective first and second chambers 28, 29, the position of the piston 30 is adapted to be changeable in the longitudinal axial direction 23 and the pin element 22, which is mechanically connected to the piston 30, is configured to be correspondingly movable in its position. The piston 30 of the hydraulic or pneumatic unit is therefore adapted in particular as a two-chamber hydraulic cylinder.

The closing element 25 is preferably configured so as to be conical at least on the perforated drum side and therefore has a conical contact surface 31. The contact surface 31 is preferably adapted to correspond to the geometry of the recess 19 which, as previously described, is configured as a tapered through recess, such that the contact surface 31 comes into surface contact when the hollow drum 10 is locked.

As can be seen in FIG. 3, the recess 19 in the rear wall element 17 of the hollow drum 10 comprises at least one through-recess portion 32 and one conical centring recess 33. In the region of the through-recess portion 32, the recess 19 of the rear wall element 17 is preferably cylindrical and its internal diameter is matched to the external dimensions of the hollow shaft 20 such that the hollow drum 10 can be slipped onto the hollow shaft 20 with a corresponding fit or can be released therefrom again. The centring recess 33 is configured to widen conically starting from the internal diameter of the recess 19 in the region of the through-recess portion 32 towards the closing element 25. The closing element 25 acts with the centring recess 33 as a centring aid for centring alignment of the hollow drum 10 on the hollow shaft 20.

The present invention is explained with reference to the foregoing, substantially in connection with the apparatus according to the invention. However, the statements made above also apply analogously to the method according to the invention such that reference is made thereto at this point.

The invention claimed is:

1. An apparatus for separating materials with different degrees of flowability, comprising:
a drive element;
a rotationally driven hollow drum with a perforated peripheral surface releasably arranged on the drive element;
a continuous press belt which can be pressed against the hollow drum from an outside while wrapping around a portion of a circumference of the hollow drum, the press belt and the hollow drum cooperating to form an intake wedge for the material to be pressed;
wherein the drive element comprises at least one controllably movable holding means which is configured and adapted to controllably lock the hollow drum on the drive element as well as to controllably release the hollow drum from the drive element.

2. The apparatus according to claim 1, wherein:
the drive element comprises a hollow drum holder; and
the hollow drum has a rear wall element having a recess adapted to receive the hollow drum holder in a positive-locking and/or non-positive-locking manner.

3. The apparatus according to claim 2, wherein:
the hollow drum holder is adapted in the manner of a hollow shaft, forming an internal space; and
the holding means comprises a pin element which is arranged in the internal space of the hollow drum holder so as to be controllably movable about a longitudinal axis.

4. The apparatus according to claim 3, wherein the pin element is adapted at its free end to receive a releasable closing element.

5. The apparatus according to claim 4, wherein the closing element has a bayonet mount adapted to releasably connect to the free end of the pin element.

6. The apparatus according to claim 4, wherein the closing element and the free end of the pin element each have threads such that the closing element is adapted to be screwable to the free end of the pin element.

7. The apparatus according to claim 6, wherein the closing element is a lock nut and the free end has an external thread adapted to receive the lock nut.

8. The apparatus according to claim 3, wherein the pin element is mechanically connected to an adjusting unit in such a manner that the position of the pin element is adapted to be positionally adjustable in a controllably variable manner.

9. The apparatus according to claim 3, wherein the adjusting unit is a hydraulic unit, a pneumatic unit or a linear electric motor unit.

10. The apparatus according to claim 8, wherein the adjusting unit is arranged in the internal space.

11. The apparatus according to claim 9, wherein the adjusting unit is the hydraulic unit and comprises a two-chamber hydraulic cylinder.

12. The apparatus according to claim 4, wherein the closing element is conical on the hollow drum side.

13. The apparatus according to claim 2, wherein the recess in the rear wall element of the hollow drum comprises at least one through-recess portion and one conical centring recess.

14. A method for operating an apparatus for separating materials with different degrees of flowability, comprising:
providing an apparatus for separating materials with different degrees of flowability comprising;
a drive element;
a rotationally driven hollow drum with a perforated peripheral surface releasably arranged on the drive element;

a continuous press belt which can be pressed against the hollow drum from an outside while wrapping around a portion of a circumference of the hollow drum, the press belt and the hollow drum cooperating to form an intake wedge for the material to be pressed;

controlling locking of the hollow drum on the drive element as well as releasing of the hollow drum from the drive element using a controllably movable holding means.

15. The method according to claim 14, further comprising controlled moving of a pin element of the holding means about a longitudinal axis in an internal space of the hollow drum holder which is configured in the manner of a hollow shaft.

16. The method according to claim 15, further comprising arranging a closing element on a free end of the pin element.

17. The method according to claim 16, wherein the closing element is arranged on the free end of the pin element by means of a bayonet mount.

18. The method according to claim 16, wherein the closing element is screwed to the free end of the pin element, preferably only hand-tight.

19. The method according to claim 15, further comprising controlled adjustment of a position of the pin element by means of an adjusting unit to which the pin element is mechanically connected.

20. The method according to claim 19, wherein the position is adjusted hydraulically, pneumatically and/or linearly by electric motor by means of the adjusting unit.

21. The method according to claim 19, wherein the adjusting unit is controllably moved in the internal space.

* * * * *